US005618600A

United States Patent [19]

Denklau

[11] Patent Number: 5,618,600
[45] Date of Patent: Apr. 8, 1997

[54] MASKED PROTECTED IMAGE PRESSURE SENSITIVE LABEL

[75] Inventor: Michael D. Denklau, Lisle, Ill.

[73] Assignee: Uarco Incorporated, Barrington, Ill.

[21] Appl. No.: 599,676

[22] Filed: Feb. 12, 1996

[51] Int. Cl.$^{6}$ .......................................... B32B 7/06

[52] U.S. Cl. .......................... 428/41.8; 428/42.1; 428/343

[58] Field of Search .......................... 428/40, 41, 42, 428/343

[56] References Cited

U.S. PATENT DOCUMENTS

| | | | |
|---|---|---|---|
| 2,783,172 | 2/1957 | Avery | 154/46.8 |
| 3,153,868 | 10/1964 | Jones | 40/2 |
| 4,231,833 | 11/1980 | Lieberman | 156/249 |
| 4,850,613 | 7/1989 | Instance | 281/5 |
| 4,914,842 | 4/1990 | Lieberman | 40/158.1 |
| 5,098,759 | 3/1992 | Felix | 428/42 |
| 5,103,583 | 4/1992 | VanErmen | 40/638 |
| 5,376,418 | 12/1994 | Rogers et al. . | |
| 5,441,796 | 8/1995 | Steidinger et al. | 428/195 |

*Primary Examiner*—William A. Krynski
*Attorney, Agent, or Firm*—Wood, Phillips, VanSanten, Clark & Mortimer

[57] ABSTRACT

A label image can remain impervious to a host of adverse environmental conditions including painting and acid washing with the disclosed invention. A protective clear mask pressure sensitive label having a protective mask sheet (42) releasably adhered with mask adhesive (44) to a sheet of transparent face stock (12) which in turn is releasably adhered with face stock adhesive (14) to a transparent release liner frame (20) section surrounding an image section (22) is disclosed. A die cut (18) is located in the release liner sheet (10) and defines a first removable frame section (20) and a second label defining section (22). The first section (20) surrounds the second section (22) so that when removed, a pattern of the adhesive (14) will be exposed. Reverse image printing (30) is disposed on the release liner second section (22).

7 Claims, 3 Drawing Sheets

MASKED PROTECTED IMAGE PRESSURE SENSITIVE LABEL

BACKGROUND OF THE INVENTION

1. Technical Field

The present invention is directed toward a pressure sensitive label having an image protection layer, and more particularly towards an image protected pressure sensitive label having an additional removable layer of protective material.

2. Background Art

Image protected, pressure sensitive labels are known in the art, and generally involve the use of a layer of protective material over an image bearing label. A common way of protecting the image bearing label is to place a larger, removable mask on top of an already mounted conventional label protectively sealing the periphery of the conventional label prior to subjecting it to harsh environmental conditions. After exposure to these conditions, the removable mask is removed.

The technique is unsatisfactory for many reasons. First of all, individually placing a removable mask over a mounted conventional label is a time consuming extra step that increases costs and slows productivity. Secondly, if the removable mask is not perfectly placed upon the conventional label, wrinkles may appear and cause a sloppy appearance. These wrinkles may also allow liquids to seep through the peripheral seal and degrade the image.

Rogers et al. in U.S. Pat. No. 5,376,418 disclose an image protected pressure sensitive label in which an image is reversibly printed on a label section of a release liner. A sheet of transparent face stock is then adhered to the release liner by a layer of transparent pressure sensitive adhesive so that the image is readable through the transparent face stock. A removable frame section of the release liner is then peeled to expose adhesive surrounding the label section. The label is then ready to be mounted on a substrate by the exposed adhesive. The label works extremely well when applied at a point in assembly of a product where no further treatment of the substrate, such as painting or washing, is to occur.

Where, however, subsequent treatment of the substrate is required, the Rogers et al. label, without more, cannot be used. Painting may partially or wholly obscure the label and/or result in an untidy appearance. Washing, particularly with harsh materials, may damage the transparent face stock making the label unusable and/or unreadable.

The present invention is directed toward overcoming one or more of the problems discussed above.

SUMMARY OF THE INVENTION

It is the principal object of the invention to provide an image protected pressure sensitive label that can be applied to a product before final processing of the surface to which the label is adhered.

More specifically, it is an object of the invention to provide such a label that may be applied to a substrate before the substrate is painted.

It also is an object of this invention to provide an image protected pressure sensitive label that can be subjected to an acid wash treatment or other harsh environmental factors such that following such exposure, the image remains protected and clearly visible.

In one aspect of the present invention, a masked pressure sensitive label form for providing a label with protected imaging includes a mask sheet and a layer of pressure sensitive adhesive on one side of the mask sheet. A sheet of transparent face stock is releasably adhered to one side of the mask sheet, the adherence being provided by the adhesive on the mask. The side of the face stock facing the mask is such as to act as a release liner for the adhesive on the mask. The face stock sheet is provided with a layer of transparent pressure sensitive face stock adhesive on one side thereof. A sheet of transparent release liner releasably adheres to one side of the face stock sheet, the adherence being provided by the adhesive on the face stock. A die cut is located in the release liner sheet and defines a first removable frame section and a second label defining section. The first section is in at least partial surrounding relation to said second section so that when removed, a pattern of the adhesive, in the partially surrounding relation to the second section, will be exposed. Reverse image printing is disposed on said release liner second section. With the above construction, the first removable frame section may be removed and the label formed, with the exposed adhesive applied to a substrate. The substrate may then be exposed to a harsh environment, after which the mask is removed from the label. The printing on the image section is visible through the transparent release liner, the transparent adhesive and transparent face stock. After the mask sheet is removed, the transparent face stock and/or the release liner provide protection for the image.

In one embodiment of the invention, the die cut is a closed die cut that extends peripherally around the entirety of the image receiving section.

Preferably the die cut is rectangular.

In one form of the invention there are a plurality of die cuts in the release liner with each one defining one of the second, image receiving sections.

In a preferred embodiment, the face stock sheet, the transparent adhesive and the release liner sheets are all substantially colorless.

According to another aspect of the invention, a masked, image protected, pressure sensitive label is provided which includes a substrate and a sheet of transparent face stock covered by a mask. Transparent pressure sensitive face stock adhesive is disposed on one side of the face stock sheet and adheres the face stock sheet to the substrate. A mask is releasably adhered to the other side of the face stock sheet by a layer of pressure sensitive mask adhesive. A section of transparent release liner is interposed between the substrate and the face stock sheet and adhered thereto by adhesive. The size of the section of transparent release liner is less than the size of the face stock sheet. Reverse image indicia is located on the release liner section on the side thereof nearest the substrate, the release liner being visible through the release liner section, the pressure sensitive adhesive, and the face stock.

In a highly preferred embodiment, the face stock sheet and the release liner section are so sized and disposed with respect to each other at every boundary of the release liner is spaced inwardly of the boundary of the space stock sheet to provide a pocket that is sealed about its periphery.

In a highly preferred embodiment the face stock sheet is formed of a relatively impermeable plastic material.

According to still another facet of the invention, there is provided a method of making an image protected, pressure sensitive label. The method includes the steps of:

(A) providing a label form including a mask sheet releasably adhered to one side of a sheet of transparent face stock by a mask adhesive;

(B) releasably adhering the other side of the sheet of transparent face stock to a transparent release liner by a transparent face stock adhesive;

(C) cutting the release liner inwardly of the periphery of the face stock sheet to define a removable section that, when removed, will expose the adhesive, and an adjacent image receiving section;

(D) inscribing reverse image indicia on an image receiving section of the release liner opposite the face stock sheet;

(E) removing the removable section to expose the adhesive;

(F) adhering the label to a substrate by the adhesive with the release liner section abutting the substrate;

(G) thereafter treating the substrate; and (H) thereafter removing the mask to expose the face stock.

In a preferred embodiment, step C, the step of cutting, is performed before step D, the step of inscribing indicia.

In one embodiment of the invention, the sheets are elongated plies and step C is performed so as to define a plurality of the image receiving sections; and step D is performed by inscribing variable information in the plurality of imaging receiving sections. In an embodiment of the invention, the release liner sheet is an elongated ply and the face stock sheet comprises a plurality of coupon adhered to the ply along the length thereof. The method includes the step of forming transverse lines of weakening in the ply between the coupons thereon. The invention contemplates that a step C may be performed by forming a plurality of rectangular die cuts in the release liner ply, one for each coupon, and in alignment with each of said coupons.

Other objects and advantages will become apparent from the following specification taken in connection with the accompanying drawing.

DETAILED DESCRIPTION OF THE PREFERRED EMBODIMENT

Figure 1:
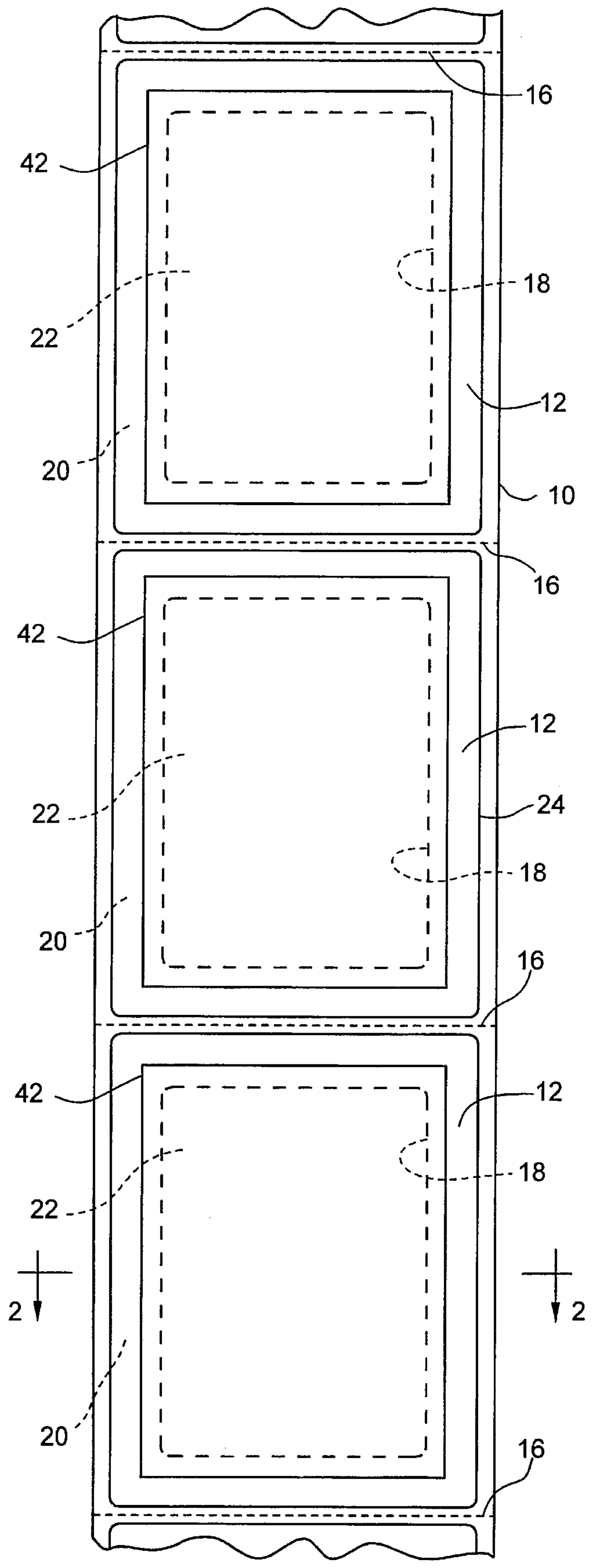
FIG. 1 shows a plan view of the preferred embodiment of the invention.

An exemplary embodiment of a masked pressure sensitive label form for providing a label with protected imaging is illustrated in FIG. 1. With reference thereto, the same is seen to include an elongated ply 10 of transparent release liner material, preferably formed of a relatively moisture impermeable material such as plastic. As is well known, the release liner 10 will be coated with a waxy substance such as a silicone compound on one side thereof so that adhesive will releasably adhere thereto.

A series of rectangular coupons 12 are located in end-to-end relation and are superimposed on the ply 10 along the length thereof as illustrated in FIG. 1. The coupons 12 are formed of a transparent face stock material, also preferably impermeable and, on their sides abutting the ply 10, are coated with a layer of face stock adhesive 14 (shown schematically by "X's" in FIG. 2). In the usual case, the coupons 12 will be formed from a single elongated ply (not shown) adhered to the ply 10. Die cutting in the ply of which the coupons 12 is formed to provide a ladder-like structure surrounding each of the coupons 12. This ladder-like structure of release liner material is then removed.

To provide for separation of the labels into individual units, transverse lines of weakening such as perforations 16 are located in the ply 10 between each of the coupons 12.

The ply 10, in alignment with each of the coupons 12, includes a rectangular die cut 18. It is important to note that the die cut 18 is located in the release liner ply 10 and not in the face stock defining the coupons 12.

According to the invention, the release liner ply 10, the face stock coupons 12, and the intervening adhesive 14 are all transparent. In a highly preferred embodiment, they are colorless as well, although in some instances, where a colored label is desired, the release liner ply 10 and/or the face stock coupons 12 and/or the adhesive 14 may be colored but again, they will nonetheless be transparent. To this and other ends of the invention, a polyester plastic may be used as both face stock and release liner material. Acrylar may also be used as face stock. The adhesive 14 may be on acrylic based adhesive or a rubber based acrylic adhesive. 3M-brand number 400 adhesive has been employed with success.

Figure 2:
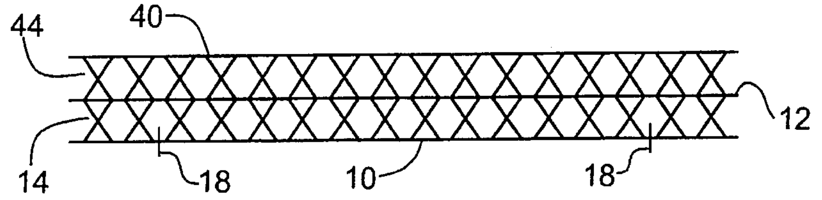
FIG. 2 shows a somewhat schematic cross-sectional view of the preferred embodiment of the invention taken approximately along the line 2—2 in FIG. 1.

In FIG. 2, the edges of the die cut 18 are shown by vertical slashes and given the reference numeral 18. Each die cut 18 divides a part of the release liner ply 10 underlying a face stock coupon 12 into a first section 20 which is in at least partial surrounding relation to a second section 22. In a preferred embodiment, the first section 20 is a removable frame which is in completely surrounding relation to the second section 22 which in turn is an image receiving section. That is to say, the die cut 18 has its boundary, in a preferred embodiment, spaced within the boundary 24 of the corresponding coupon 12. This provides a rectangular frame of release liner material that may be grasped and separated from the face stock coupon 12, leaving the adhesive 14 adhered to the latter. The separation is illustrated in FIG. 3 with the frame or first section 20 partially removed from the remainder of the label.

Figure 3:
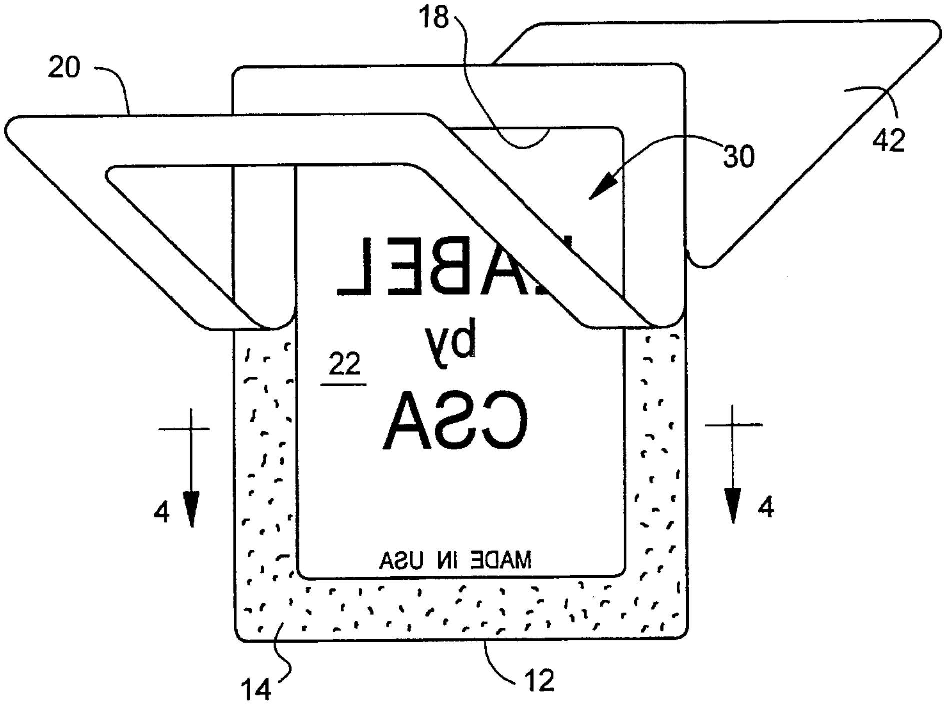
FIG. 3 is a perspective view of a label form made according to the invention and illustrating the removal of a frame of the release liner to expose adhesive on the face stock and removal of the mask to expose the non-adhesive side of the face stock.

It will be appreciated that the image receiving section of the release liner ply 10 remains in place as illustrated in FIG. 3.

Generally speaking, prior to the removal process, but conceivably afterwards, imaging is applied to the surface of the second section 22 remote from the coupons 12. As seen in FIG. 3, the imaging is reverse imaging, generally designated 30, and consists of the message "LABEL by CSA Made in USA".

Figure 4:
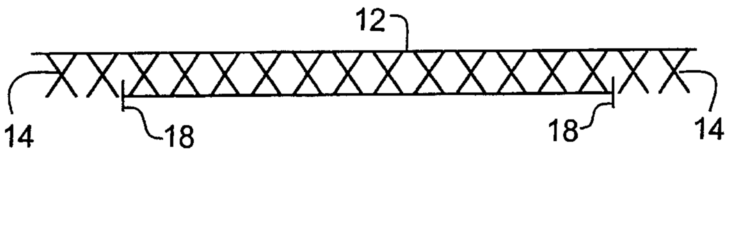
FIG. 4 is a sectional view of the label taken approximately along the line 4—4 in FIG. 3.

Inverting the form from the position illustrated in FIG. 3 yields the schematic sectional view shown in FIG. 4. It will be appreciated that a rectangular pattern of adhesive 14 will be exposed about the entire periphery of the image receiving section 22 of the release liner ply 10.

According to the invention a ply of masking material 40 is placed on the face stock coupons 12 and divided into a series of individual masks 42, one for each coupon. The material of which the ply 40 is formed preferably is, but need not be, transparent. The side of each mask 42 adjacent the coupons 12 bears a layer 44 of low tack, removable pressure sensitive adhesive. If desired part or all of the side of each coupon 12 facing the masks 42 is coated with a waxy substance, such as a silicone compound, so as to function as a release liner for each mask 42 and the adhesive 44 thereon. For example, silicone could be placed under a corner of the mask 42 to provide a gripping tab whereby the mask 42 can be readily grasped for easy removal.

The mask is intended to accept paint from an end user's painting process and protect the base label from this point. After the painting process, the mask 42 can be removed, exposing the image that was printed on the second section 22.

Figure 5:
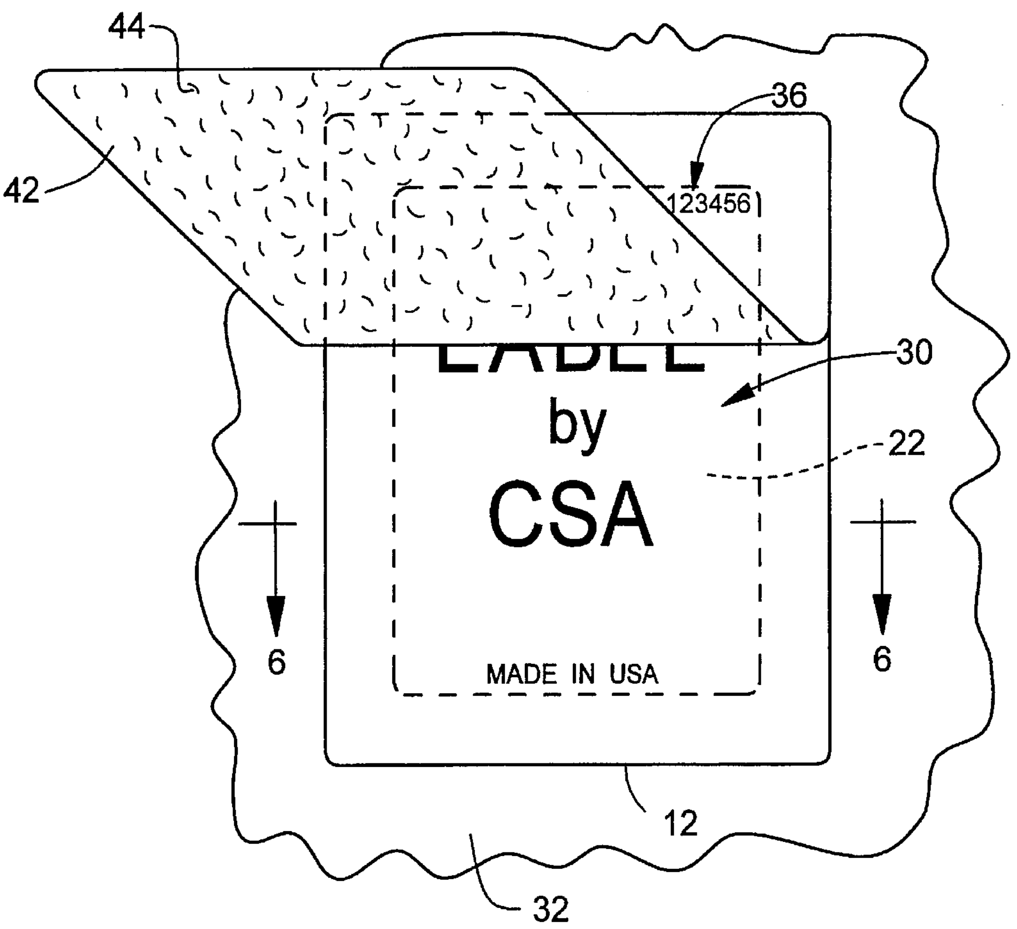
FIG. 5 is a plan view of the label applied to a substrate with the mask partially removed.
Figure 6:
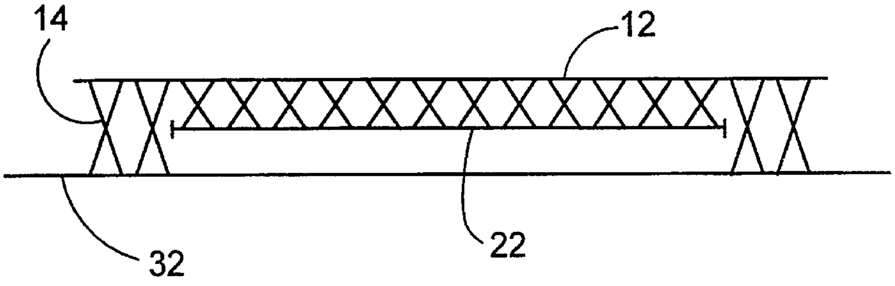
FIG. 6 is a schematic sectional view taken approximately along the line 6—6 in FIG. 5.

In use with the removable section 20 removed and the imaging 30 in place, the label will then be applied to a substrate such as shown at 32 in FIGS. 5 and 6. The application is shown with the face stock coupon 12 uppermost after the mask 42 is pulled away, and with frame of adhesive 14 and the second, image receiving section 22 lowermost. The application of pressure will cause the frame of adhesive 14 to adhere to the substrate 32 and seal thereagainst about the entire periphery of the second, image receiving section 22. If desired, the removable section 20 could be configured so as to provide only two bands of adhesive, on opposite sides of the second section 22, a three sided U-shaped pattern of adhesive, or any other desired configuration. Of course, when the label is adhered to the substrate 32 by less than a completely closed pattern of the adhesive 14, a path of entry for environmental material is left which may not be desirable in many instances. On the other hand, in some instances it might be highly desirable in forming a pocket into which other materials might be inserted.

In any event, once the label is installed as illustrated in FIGS. 5 and 6, it will be appreciated that the side of the second, image receiving section 22 on which the indicia 30 was inscribed will be immediately abutting the substrate 32. The substrate 32 may now be painted or cleaned or even simply transported with other objects to a different location. All the while, the coupon 12 will be protected by the mask 42 which the coupon and the image receiving section 22 protected in turn by the coupon 12. Thereafter, when the potential for damage to the label is past, the mask 42 may be peeled from the coupon 12.

Because the release liner ply 10, the face stock coupon 12 and the adhesive 14 are all transparent, the indicia 30 will be visible through all three and appear as illustrated in FIG. 5. That is to say, the indicia 30 will be visible by reason of the transparency of the materials and the same will now appear in a regular or non-reversed form by reason of the fact that the indicia receiving side of the second section 22 is lowermost and was reverse imaging printed to begin with.

It can thus be appreciated that, after the label is subjected to harsh environmental conditions and the mask 42 is removed, the imaging defining the indicia 30 is still protected by both the face stock coupons 12 and the second section 22 of the release liner. Where a full and continuous pattern of adhesive as shown in FIG. 3 is employed, and where the face stock material defining the coupon 12 is a preferred, relatively impermeable plastic material, the indicia 30 will actually be sealed from the environment as well.

As mentioned previously, in a highly preferred embodiment, the transparent materials of which the label is made are also preferably colorless. Thus, when the label is applied to, for example, a metal substrate such as aluminum or stainless steel, the appearance of the substrate is visible through the label as well to provide a highly pleasing label construction.

Importantly, when the invention is made in continuous form subject to subsequent separation along the lines of weakening 16, a great deal of flexibility in label use is provided. For example, by using a computer controlled printer to provide the inscription of the indicia 30, variable information may be inscribed on each label, in whole or in part as the label form is fed through the printer. Thus, the indicia given the general reference numeral 30 in FIGS. 3 and 5 may remain fixed from one label to another while a serial number for a machine or the like, shown generally at 36 in FIG. 5, which would be different from each label to the next, could be printed thereon. Alternatively, the entirety of the indicia 30 on a label could be fixed information or as still another alternative, it could all be variable information, with no information being common from one label to the next.

In all events, use of the label made according to the invention eliminates the step of applying an overlay to a pressure sensitive label to achieve image protection. At the same time, since only one application step is required, and because the second section 22 of the release liner ply is always in place and gives stiffness to the label, wrinkling of the label during application as contrasted to wrinkling of an overlay, is far less likely to occur.

I claim:

1. In a pressure sensitive label form for providing a label with protected imaging including:

a sheet of transparent face stock;

a layer of transparent pressure sensitive adhesive on one side of said face stock sheet;

a sheet of transparent release liner releasably adhered to said one side of said face stock sheet by said adhesive;

a die cut in said release liner sheet and defining a first removable frame section and a second label defining section, said first section being in at least partial surrounding relation to said second section so that when removed, a pattern of said adhesive in said partial surrounding relation to said second section will be exposed; and reverse image printed on said release liner second section, the improvement comprising a mask on the other side of said face stock sheet and a further layer of pressure sensitive adhesive removably adhering said mask to said other side of said face stock sheet.

2. The label form of claim 1 wherein said die cut is a closed die cut extending peripherally around the entirety of said second section.

3. The label form of claim 2 wherein said die cut is rectangular.

4. The label form of claim 2 wherein there are a plurality of said die cuts in said release liner, each defining one of said second sections.

5. The label form of claim 1 wherein said face stock sheet, said adhesive and said release liner sheet are substantially colorless.

6. In an image protected, pressure sensitive label comprising:

a substrate;

a sheet of transparent face stock;

transparent pressure sensitive adhesive on one side of said face stock sheet and adhering said face stock sheet to said substrate;

a section of transparent release liner interposed between said substrate and said face stock sheet and adhered thereto by said adhesive, the size of said section being less than the size of said face stock sheet; and reverse image indicia on said section on the side thereof nearest said substrate;

the improvement comprising a mask on the other side of said face stock sheet and a further layer of pressure sensitive adhesive removably adhering said mask to said other side of said face stock sheet.

7. The image protected, pressure sensitive label of claim 6 wherein said face stock sheet and said release liner sections are so sized and disposed with respect to each other that the boundary of said release liner section is spaced inwardly of the boundary of said face stock sheet.

* * * * *